(12) United States Patent
Otto et al.

(10) Patent No.: US 8,440,942 B2
(45) Date of Patent: May 14, 2013

(54) CIRCUIT ARRANGEMENT FOR PROTECTION OF A HEATING ELEMENT FROM OVERHEATING HEATING DEVICE AND METHOD FOR FUSED PROTECTION OF THE HEATING DEVICE

(75) Inventors: Manuel Otto, Dillingen (DE); Peter Schweier, Forheim (DE); Martin Stickel, Giengen (DE); Franz-Josef Wagner, Nördlingen (DE)

(73) Assignee: Bsh Bosch und Siemens Hausgeraete GmbH, Munich (DE)

( * ) Notice: Subject to any disclaimer, the term of this patent is extended or adjusted under 35 U.S.C. 154(b) by 1327 days.

(21) Appl. No.: 10/582,925

(22) PCT Filed: Dec. 10, 2004

(86) PCT No.: PCT/EP2004/053402
§ 371 (c)(1),
(2), (4) Date: Apr. 13, 2007

(87) PCT Pub. No.: WO2005/062149
PCT Pub. Date: Jul. 7, 2005

(65) Prior Publication Data
US 2008/0023464 A1 Jan. 31, 2008

(30) Foreign Application Priority Data
Dec. 22, 2003 (DE) .................. 103 60 553

(51) Int. Cl.
*H05B 1/00* (2006.01)
(52) U.S. Cl.
USPC .................. 219/481; 219/494; 219/497

(58) Field of Classification Search .............. 219/481
See application file for complete search history.

(56) References Cited

U.S. PATENT DOCUMENTS

| 4,035,692 A * | 7/1977 | Luy et al. ............ 361/103 |
| 4,198,957 A * | 4/1980 | Cage et al. ............ 606/37 |

(Continued)

FOREIGN PATENT DOCUMENTS

| EP | 0 579 947 | 1/1994 |
| GB | 2 047 752 | 12/1980 |

OTHER PUBLICATIONS

International Search Report PCT/EP2004/053402, Aug. 28, 2006 ISA PCT.

*Primary Examiner* — Henry Yuen
*Assistant Examiner* — Brian Jennison
(74) *Attorney, Agent, or Firm* — James E. Howard; Andre Pallapies

(57) ABSTRACT

A circuit arrangement is provided for protecting from overheating a heating element whose resistance value is a function of its temperature. The circuit arrangement includes a power supply, a switch, and a switch control circuit, a current sensor providing a signal proportional to the current flowing through the heating element, and a first scaling device whose output provides a signal proportional to the supply voltage of the heating element. An evaluation circuit compares the difference signal determined by a first detector having an output that provides a difference signal formed from the signals of the current sensor and the first scaling device with a reference signal and the switch control circuit can be switched from a conducting state when the switch control circuit is in a first state to a non-conducting state when the switch control circuit is in a second state.

24 Claims, 1 Drawing Sheet

U.S. PATENT DOCUMENTS 4,516,543 A * 5/1985 Abe et al. .................. 123/179.21
4,736,090 A * 4/1988 De Broeck et al. ........... 219/497
4,777,350 A * 10/1988 Crocket et al. ................ 219/497
5,847,367 A 12/1998 Hancock et al.

* cited by examiner

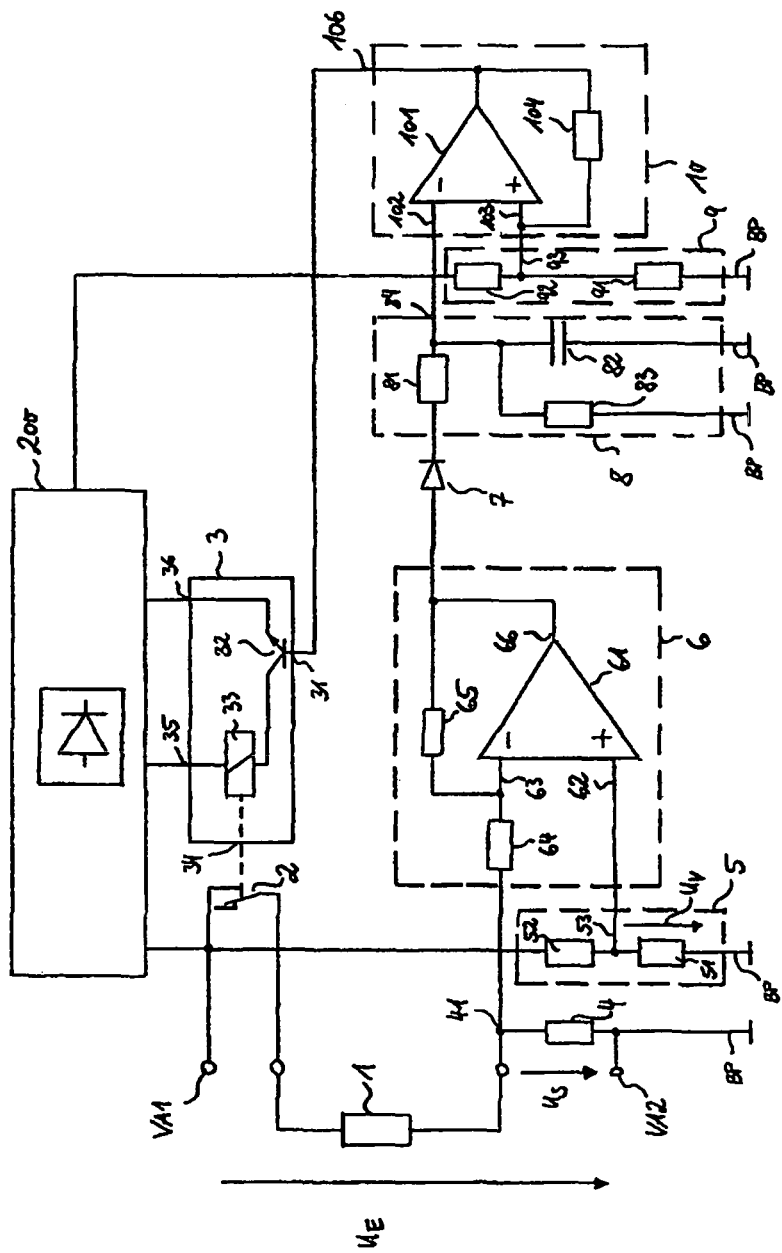

CIRCUIT ARRANGEMENT FOR PROTECTION OF A HEATING ELEMENT FROM OVERHEATING HEATING DEVICE AND METHOD FOR FUSED PROTECTION OF THE HEATING DEVICE

The application relates to a circuit arrangement for protection of a heating element from overheating, the resistance value of which is a function of its temperature. The application further relates to a heating device for fluids and a method for fused protection of such a heating device from damage.

BACKGROUND OF THE INVENTION

Heating elements used in heating devices for heating fluids can be permanently damaged if the heating device is run dry and if water boils away. Electrical resistance heaters based, among other things, on thick film technology are used as heating elements for water heating in household appliances, such as for example water boilers, coffee machines, dishwashers and washing machines. Specific safety requirements are imposed on these. For example, fused protection against fire, against leaks and against voltage breakdowns must be provided on the heating element. In particular, according to a valid standard, fused protection against voltage breakdown must be provided not via the existing building or house fuses. In order to meet this requirement, it is usual to use heat protection switches, pressure switches which detect the presence of a fluid or melting fuses which melt and separate the heating circuit in the event of the heating element running dry and the continuous heating thereof thus produced.

However, these fuses have considerable disadvantages. The afore-mentioned pressure switch has a relatively slow response behaviour. Melting fuses result in an irreversible separation of the heating circuit when triggered whereby the heating device exhibits a defect and thus results in a case for customer service, incurring high costs.

It would thus be desirable to have a fuse system which protects a heating device of the type specified previously simply, quickly and cost-effectively, independently of any appliance control system which may be present.

Known from EP 0 845 119 B1 is a circuit arrangement for regulating the temperature of a heating element whose resistance value is a function of temperature. For this purpose, the circuit arrangement has a current sensor means coupled to the heating element, which delivers an AC voltage at one output which depends on the alternating current flowing through the heating element. This signal and a reference value predefined by a user are supplied to a first detector means. This delivers an output signal if the temperature of the heating element exceeds a temperature set by the user. A switching means connected in series to the heating element is then controlled according to the pulse-pause principle by means of a switch control circuit.

A circuit arrangement for protecting a braking resistor in a traction motor is furthermore known from U.S. Pat. No. 4,035,692. This circuit arrangement has a power supply coupled to the braking resistor to deliver a current to the braking resistor by means of a switching means. A current sensor means coupled to the braking resistor at whose output a signal proportional to the current flowing through the braking resistor can be tapped and a first scaling means in the form of a potentiometer and a resistor connected in series thereto at whose output a signal proportional to the supply voltage of the braking resistor can be tapped, are supplied to a differential amplifier which delivers a voltage value corresponding to the temperature. This signal is used to protect the braking resistor from overheating by opening the switching means.

SUMMARY OF THE INVENTION

It is thus the object of the present invention to provide a circuit arrangement for protecting a heating element from overheating which is simple, fast and cost-effective. Further, a heating element protected from overheating and a method for protecting such a device are also to be provided.

This object is solved by a circuit arrangement, a heating device and a method according to the exemplary embodiments described herein.

According to the invention, the circuit arrangement for protecting a heating element from overheating, whose resistance value is a function of its temperature, has the following features:

a power supply coupled to the heating element for supplying a current to the heating element by means of a switch means;

a switch control circuit with an output for controlling the switching means, wherein the switching means is switched to a conducting state when the switch control circuit is in a first state, and is switched to a non-conducting state when the switch control circuit is in a second state;

a current sensor means coupled to the heating element, the output of which provides a signal proportional to the current flowing through the heating element;

a first scaling means, the output of which provides a signal proportional to the supply voltage of the heating element;

a first detector means having inputs each coupled to the outputs of the current sensor means and the first scaling means, the output of which provides a difference signal formed from the signals of the current sensor means and the scaling means;

an evaluation circuit by which means the difference signal determined by the first detector means may be compared with a reference signal and depending on the result, the switch control circuit can be brought from the first into the second state by the evaluation circuit.

The invention is thus based on the finding that the resistance of a heating element possesses a characteristic temperature behaviour. Depending on the design of the heating element, it can increase, decrease or remain the same. In the first two cases, it is possible to indirectly monitor the temperature of the heating element by monitoring the resistance of the heating element. If the resistance of the heating element exceeds or falls below a certain value, overheating exists.

It is not possible to directly measure the resistance of the heating element since this is acted upon by the supply voltage during operation. The resistance must therefore be calculated indirectly by measuring the current through the heating element and the voltage at the heating element.

According to Ohm's law, the ratio of voltage to current must be determined for this purpose. This is indeed possible but laborious. Instead, the invention uses an approximation of ratio formation (division) by a Taylor series expansion and discontinues this after the second term. The division is thus replaced by a subtraction which can be implemented very simply in circuit technology by the first detector means. This means that a descending line is obtained from the division hyperbola. The error thereby incurred does not play a fundamental role for the function of the circuit arrangement if both terms are normalised to the same quantity before the analogue subtraction of voltage and current. This is achieved on the one hand by the first scaling means which normalises the current. The operating voltage of the heating element can be reduced to the desired value by means of a voltage divider. The voltage divider is the first scaling means. The current through the heating element flows through a shunt across which a voltage proportional to the current is produced. Preferably provided in the first detector means is a further scaling means which appropriately normalises the signal delivered by the current sensor means.

The current sensor means and the first scaling means are preferably configured such that the signals which can be tapped at their output have the same magnitude at the nominal resistance of the heating element. Thus, the voltage divider and the shunt are preferably designed so that both voltages have the same magnitude at the nominal resistance of the heating element.

If the operating voltage of the heating element now varies by a certain percentage, the current through the heating element thus also varies by this percentage. The measured voltages obtained by means of the first scaling means or the current sensor means thus vary by the same percentage so that their difference remains 0. However, if the resistance of the heating element varies due to temperature, a signal which can be detected by the evaluation circuit is obtained at the output of the first detector means. This can be compared with a reference signal from which any overheating of the heating element can be deduced. In this case, the heating element can be protected from damage by separating the electrical connection by means of the switching means. For this purpose the evaluation circuit is connected to the switch control circuit which changes from the first to the second state and thereby opens the switching means.

The circuit arrange is thus preferably designed so that the difference voltage in the evaluation circuit is compared with a fixed threshold value. In this case, if a supply voltage lies above the nominal voltage, the protection circuit will respond for a smaller change in resistance. The converse holds accordingly if the voltage is below the nominal voltage.

Therefore, if the resistance of the heating element deviates from its nominal resistance, a voltage is present at the output of the first detector means. The absolute magnitude of this difference voltage depends on the operating voltage. This is the error which arises if the Taylor series is interrupted after the second term. It is thus advantageous if the evaluation circuit has a second detector means with two inputs and one output, wherein the output signal of the first detector means can be supplied to one input and the reference signal can be supplied to the other input, and wherein the output forms the output of the evaluation circuit.

For setting the reference signal, the evaluation circuit preferably has a second scaling means. In a particularly advantageous embodiment, the second scaling means is coupled to the supply voltage acting upon the heating element to derive the reference signal from the supply voltage. If a threshold value obtained from the mains voltage by means of the scaling means is used as the reference signal, the operating voltage sensitivity of the first detector means can be compensated thereby.

Appropriately, in a further advantageous embodiment the output of the second detector means is fed back to the input. The evaluation circuit is thereby provided with a hysteresis to allow fast and reliable switching of the switching means, controlled by the switch control circuit, in the event of a fault. In this case, the switching means interrupts the connection to the heating element. The circuit arrangement thus effectively sees a heating device with an infinitely high resistance. However, this is precisely the trigger condition so that the circuit arrangement continues to remain in the state in which the heating circuit of the heating element is separated. The circuit arrangement thus has a self-retaining character.

In a further embodiment, it is provided that the power supply of the heating element is an AC voltage, and a rectifier arrangement and a smoothing circuit which are part of the evaluation circuit, are connected between the first and the second detector means. When the circuit arrangement is operated with an alternating voltage, an alternating voltage is present at the output of the first detector means, its magnitude depending on the resistance deviation. The phase position indicates whether the resistance is higher or lower than the nominal resistance. This applies if the heating element exhibits principally ohmic behaviour. For further evaluation the alternating voltage must be rectified and low-pass filtered. If phase-selective rectification is used, information on the exceeding or falling below is retained. Otherwise, after rectification it is no longer possible to distinguish whether the resistance of the heating element is exceeded or fallen below.

It is further provided that the switching means is a relay which becomes operative in the first state of the switch control circuit when the heating element is operating correctly. This means that for safety reasons the relay is connected so that it becomes operative when the heating is operating correctly.

The low pass for alternating current operation is designed so that it intercepts the peaks formed at the output of the first detector means when switching on and switching off the heating and thus prevents the "self-retaining state" described when switching on the heating element.

The heating element to be monitored by the circuit arrangement according to the invention is preferably an electrical resistance heater, especially made from thick film paste, with PTC behaviour where the resistance increases with increasing temperature. Heating elements of this type are particularly liable to overheating and thus require a particularly fast fuse device. This cannot usually be ensured by the melting fuses used so far.

The heating device for fluids according to the invention comprises a circuit arrangement according to the invention for protecting a heating element from overheating. This has the same advantages as have been explained above in connection with the circuit arrangement according to the invention.

In contrast to the usual fuse precautions where a heating element is executed with a thermal-mechanical fuse, generally a melting fuse, the method according to the invention for the first time uses an electronic fuse for the fused protection against damage of a heating device for fluids comprising a heating element. In this method, the resistance value of the heating element is a function of its temperature and the change in the resistance is detected and compared with a reference signal. Depending on the comparison, the heating circuit is optionally interrupted by means of a switching means.

BRIEF DESCRIPTION OF DRAWINGS

The invention is explained in detail hereinafter in conjunction with the single FIGURE from which the circuitry of the circuit arrangement according to the invention can be seen.

DETAILED DESCRIPTION OF THE
EXEMPLARY EMBODIMENTS OF THE
PRESENT INVENTION

A heating element 1, embodied as an electric resistance heater, is connected to a switching means 2 and a current sensor means 4 in the form of a shunt in series between a first supply connection VA1 and a second supply connection VA2. An input voltage $U_E$ is applied between the supply connections VA1 and VA2.

The switching means 2 in the form of a relay can be controlled by means of a switch control circuit 3. In the FIGURE the switch control circuit 3 has a second state in which the switching means is switched to non-conducting. However, the switching means 2 is switched to conduction when the switch control circuit 3 is in a first state. The switch control circuit 3 has a transistor 32 which is connected with a first main connection to a relay 33. The other main connection of the transistor 32 forms an output 36 of the switch control circuit 3 and is connected to a power supply 200. The relay is also connected thereto by means of a further output connection 35 of the switch control circuit 3.

The power supply 200, which is not described in further detail hereinafter, substantially comprises a rectifier circuit which rectifies the alternating voltage or alternating current signal applied to the supply connections VA1, VA2 and transforms to a corresponding level in order to supply energy to the switch control circuit 3 and further switching elements described later.

The node point formed between the heating element 1 and the current sensor means 4 forms an output 41 of the current sensor means. The voltage $U_S$ is present between the output 41 and the supply connection VA2. The output 41 is coupled to an input 63 of a first detector means 6. More accurately, the output 41 is connected by means of a resistor 64 to the inverting input 63 of a comparator 61 of the first detector means 6. A second input of the first detector means 6 is connected to a first scaling means 5, which is formed by a voltage divider consisting of the resistors 51, 52. The scaling means 5 is connected between the first supply connection VA1 and a reference potential connection BP. The node point 53 formed between the resistors 51, 52 is connected to the second input of the first detector means 6. More accurately, there is a connection between the node point 53 and the non-inverting input 62 of the comparator 61. The voltage UV is applied via the resistor 51 and is supplied to the non-inverting input 62 of the comparator. One output 66 of the comparator 61 at the same time forms the output of the first detector means 6. This is electrically connected by means of a resistor 65 to the input 63 of the comparator 61. The resistors 64, 65 form a scaling means for the current sensor means 4.

During operation of the heating element 2 with an alternating voltage, an alternating voltage is also present at the output 66 of the comparator or differential amplifier, its magnitude depending on the resistance deviation. For further evaluation of this alternating voltage signal this is evaluated by means of a rectifier arrangement 7 formed by a diode and a smoothing circuit 8 embodied as a low-pass filter. The smoothing circuit 8 has a resistor 81 connected in series to the rectifier arrangement 7. Another resistor 83 and a charge storage device 82 are connected between the output 84 of the smoothing circuit and a reference potential connection. All reference potential connections provided with the reference symbol BP can be electrically connected to one another.

The output 84 of the smoothing circuit 8 is connected to an input 102 of a second detector means 10. This input is connected to the non-inverting input of a comparator 101. The second input of the second detector means 10 is coupled to a second scaling means 9. This in turn consists of a voltage divider with the resistors 91, 92. The second scaling means 9 is connected between the reference potential connection BP and the power supply 200. The node point between the resistors 91, 92 is connected to the second input of the second detector means 10 or the non-inverting input 103 of the comparator 101. This non-inverting input 103 is connected by means of a resistor 104 to an output 106 of the comparator 101 which at the same time corresponds to the output of the second detector means or the evaluation circuit formed from the first detector means 6, the rectifier arrangement 7, the smoothing circuit 8, the second scaling means 9 and the second detector means 10. The output 106 is coupled to the switch control circuit 3. The input connection 31 of the switch control circuit is in this case formed by the control connection of the transistor 32. The second detector means is provided with a hysteresis made possible by the resistor 104. This ensures fast and reliable switching of the relay located in the switch control circuit 3 in the event of a fault. This interrupts the connection of the heating element 1 to the supply connections VA1, VA2 and switches the switch control circuit 2 from a first to a second state.

In this situation shown in FIG. 1, the circuit arrangement sees a heating element with an infinitely high resistance. This corresponds to the trigger conditions of the circuit arrangement according to the invention whereby this stays in a safe state. A self-retaining character is thus accomplished in a simple manner.

Particularly reliable elements for fluids can be provided with the present circuit arrangement whereby mechanical damage to the heating device is eliminated in the event of it running dry, as is the case with the melting fuses used hitherto.

REFERENCE LIST

1 Heating element
2 Switching means
3 Switch control circuit
31 Input connection
32 Transistor
33 Relay
34 Output
35 Output connection
36 Output connection
4 Current sensor means
41 Output
5 Scaling means
51 Resistor
52 Resistor
53 Output
6 Detector means
61 Comparator
62 Input
63 Input
64 Resistor
65 Resistor
66 Output
7 Rectifier arrangement
8 Smoothing circuit
81 Resistor
82 Charge storage device
83 Resistor
84 Output
9 Scaling means
91 Resistor
92 Resistor
93 Output
10 Detector means
101 Comparator
102 Input
103 Input 104 Resistor
106 Output
200 Power supply
$U_E$ Input voltage
$U_S$ Voltage
$U_V$ Voltage
VA1 Supply connection
VA2 Supply connection
BP Reference potential connection

The invention claimed is:

1. A circuit arrangement for protecting from overheating a heating element whose resistance value is a function of its temperature, the circuit arrangement comprising:
 a switch means;
 a power supply coupled to the heating element for supplying a current to the heating element by means of the switch means;
 a switch control circuit with an output for controlling the switch means such that the switch means is switched to a conducting state when the switch control circuit is in a first state and the switch means is switched to a non-conducting state when the switch control circuit is in a second state;
 a current sensor means coupled to the heating element, the output of the current sensor means providing a signal proportional to the current flowing through the heating element;
 a first scaling means whose output provides a signal proportional to a supply voltage of the heating element;
 a first detector means having inputs each coupled to an output of a respective one of the current sensor means and the first scaling means, the first detector means having an output that provides a difference signal formed from the signals of the current sensor means and the scaling means; and
 an evaluation circuit operable to compare the difference signal determined by the first detector means with a reference signal, wherein the evaluation circuit comprises:
  second detector means having a first input, a second input, and an output, wherein the output of the second detector means forms the output of the evaluation circuit, the first input coupled to the output of the first detector means; and
  second scaling means for providing the reference signal, the second scaling means including a voltage divider having a first resistor and a second resistor, wherein an output node of the second scaling means is between the first resistor and the second resistor and the output node is coupled to the second input of the second detector means for providing the reference signal to the second input of the second detector means,
  the switch control circuit being operatively connected to the evaluation circuit such that the switch control circuit can be switched from the first state into the second state by the evaluation circuit.

2. The circuit arrangement according to claim 1, wherein the current sensor means and the first scaling means are configured such that the signals which can be tapped at their output have the same magnitude at the nominal resistance of the heating element.

3. The circuit arrangement according to claim 1 wherein a difference voltage can be detected by the first detector means only in the event of a change in the resistance value of the heating element.

4. The circuit arrangement according to claim 1, wherein the second scaling means is coupled to the supply voltage acting upon the heating element to derive the reference signal from the supply voltage.

5. The circuit arrangement according to claim 1, wherein the output of the second detector means is fed back to the second input of the second detector means.

6. The circuit arrangement according to claim 1, wherein the power supply of the heating element is an AC voltage, and wherein a rectifier arrangement and a smoothing circuit are connected between the first detector means and the second detector means.

7. The circuit arrangement according to claim 1, wherein the switch means includes a relay that becomes operative in the first state of the switch control circuit when the heating element is operating correctly.

8. The circuit arrangement according to claim 1, wherein the heating element is an electrical resistance heater, especially made from thick film paste, with PTC behavior where the resistance increases with increasing temperature.

9. A heating device for heating fluids, the heating device comprising:
 a heating element for heating the fluids; and
 a circuit arrangement for protecting from overheating the heating element whose resistance value is a function of its temperature, the circuit arrangement comprising:
  a switch means;
  a power supply coupled to the heating element for supplying a current to the heating element by means of the switch means;
  a switch control circuit with an output for controlling the switch means such that the switch means is switched to a conducting state when the switch control circuit is in a first state and the switch means is switched to a non-conducting state when the switch control circuit is in a second state;
  a current sensor means coupled to the heating element, the output of the current sensor providing a signal proportional to the current flowing through the heating element;
  a first scaling means whose output provides a signal proportional to a supply voltage of the heating element;
  a first detector means having inputs each coupled to an output of a respective one of the current sensor means and the first scaling means, the first detector means having an output that provides a difference signal formed from the signals of the current sensor means and the scaling means; and
  an evaluation circuit operable to compare the difference signal determined by the first detector means with a reference signal, wherein the evaluation circuit comprises:
   second detector means having a first input, a second input, and an output, wherein the output of the second detector means forms the output of the evaluation circuit, the first input coupled to the output of the first detector means; and
   second scaling means for providing the reference signal, the second scaling means including a voltage divider having a first resistor and a second resistor, wherein an output node of the second scaling means is between the first resistor and the second resistor and the output node is coupled to the second input of the second detector means for providing the reference signal to the second input of the second detector means,
   the switch control circuit being operatively connected to the evaluation circuit such that the switch control circuit can be switched from the first state into the second state by the evaluation circuit.

10. A method for fused protection from damage of a heating device for fluids, the heating device including a heating element and the heating element having a resistance value that is a function of its temperature, the heating device further comprising:
a circuit arrangement for protecting from overheating the heating element, the circuit arrangement comprising:
a switch means;
a power supply coupled to the heating element for supplying a current to the heating element by means of the switch means;
a switch control circuit with an output for controlling the switch means such that the switch means is switched to a conducting state when the switch control circuit is in a first state and the switch means is switched to a non-conducting state when the switch control circuit is in a second state;
a current sensor means coupled to the heating element, the output of the current sensor providing a signal proportional to the current flowing through the heating element;
a first scaling means whose output provides a signal proportional to a supply voltage of the heating element;
a first detector means having inputs each coupled to an output of a respective one of the current sensor means and the first scaling means, the first detector means having an output that provides a difference signal formed from the signals of the current sensor means and the scaling means; and
an evaluation circuit operable to compare the difference signal determined by the first detector means with a reference signal, wherein the evaluation circuit comprises:
second detector means having a first input, a second input, and an output, wherein the output of the second detector means forms the output of the evaluation circuit, the first input coupled to the output of the first detector means; and
second scaling means for providing the reference signal, the second scaling means including a voltage divider having a first resistor and a second resistor, wherein an output node of the second scaling means is between the first resistor and the second resistor and the output node is coupled to the second input of the second detector means for providing the reference signal to the second input of the second detector means,
the switch control circuit being operatively connected to the evaluation circuit such that the switch control circuit can be switched from the first state into the second state by the evaluation circuit,
the method comprising:
detecting change in the resistance value of the heating element using the difference signal, which is provided by the first detector means and formed from the signal proportional to the current flowing through the heating element, which is provided by the current sensor means, and a signal proportional to the supply voltage of the heating element, which is provided by the first scaling means; and
comparing, using the evaluation circuit, the detected change in the resistance value of the heating element with the reference signal, which is provided by the second scaling means, and selectively interrupting the heating circuit by means of the switch means in dependence upon the comparison of the detected change in the resistance with the reference signal.

11. A circuit arrangement in combination with a heating element for heating fluids, the circuit arrangement for protecting from overheating the heating element whose resistance value is a function of its temperature, the circuit arrangement comprising:
the heating element for heating the fluids;
a switch;
a power supply coupled to the heating element by the switch and supplying a current to the heating element;
a switch control circuit with an output for controlling the switch such that the switch is switched to a conducting state when the switch control circuit is in a first state and the switch is switched to a non-conducting state when the switch control circuit is in a second state;
a current sensor coupled to the heating element, the output of the current sensor providing a signal proportional to the current flowing through the heating element;
a first scaling device having an output that provides a signal proportional to a supply voltage of the heating element;
a first detector having inputs each coupled to an output of a respective one of the current sensor and the first scaling device, the first detector having an output that provides a difference signal formed from the signals of the current sensor and the scaling device; and
an evaluation circuit operable to compare the difference signal determined by the first detector with a reference signal, the switch control circuit being operatively connected to the evaluation circuit such that the switch control circuit can be switched from the first state into the second state by the evaluation circuit, wherein the evaluation circuit includes:
a second detector having a first input, a second input, and an output, wherein the output signal of the first detector is supplied to the first input of the second detector, and wherein the reference signal is supplied to the second input of the second detector, and wherein the output of the second detector forms the output of the evaluation circuit; and
a second scaling device that sets the reference signal, the second scaling device including a voltage divider having a first resistor and a second resistor, wherein an output node of the second scaling device is between the first resistor and the second resistor and the output node is coupled to the second input of the second detector for providing the reference signal to the second input of the second detector.

12. The circuit arrangement according to claim 1, further comprising:
the heating element for heating the fluids.

13. The circuit arrangement according to claim 1, the second detector means for subtracting the difference signal of the first detector means and the reference signal, wherein the output signal of the first detector means is supplied to the first input of the second detector means.

14. The circuit arrangement according to claim 13, further comprising:
the heating element.

15. The circuit arrangement according to claim 14, wherein the second scaling means is coupled to the supply voltage acting upon the heating element to derive the reference signal from the supply voltage.

16. The circuit arrangement according to claim 13, wherein the output of the second detector means is fed back to the second input of the second detector means.

17. The circuit arrangement according to claim 14, wherein the power supply of the heating element is an AC voltage, and
wherein a rectifier arrangement and a smoothing circuit are connected between the output of the first detector means and the first input of the second detector means.

18. A circuit arrangement for protecting a heating element, whose resistance value is a function of its temperature, from overheating, the circuit arrangement comprising:
the heating element;
a switch means;
a power supply coupled to the heating element and supplying a current to the heating element via the switch means;
a switch control circuit with an output for controlling the switch means such that the switch means is switched to a conducting state when the switch control circuit is in a first state and the switch means is switched to a non-conducting state when the switch control circuit is in a second state;
current sensor means, which is coupled to the heating element, for outputting a signal proportional to the current flowing through the heating element;
first scaling means for normalizing the current and outputting a signal proportional to a supply voltage of the heating element;
first detector means for subtracting the signals of the current sensor means and the scaling means, the first detector means having inputs each coupled to an output of a respective one of the current sensor means and the first scaling means, the first detector means outputting a difference signal formed from the signals of the current sensor means and the scaling means; and
an evaluation circuit comparing the difference signal determined by the first detector means with a reference signal, the switch control circuit being operatively connected to the evaluation circuit such that the switch control circuit can be switched from the first state into the second state by the evaluation circuit, wherein the evaluation circuit comprises:
second scaling means for setting the reference signal;
second detector means for subtracting the difference signal of the first detector means and the reference signal, the second detector means having a first input, a second input, and an output, wherein the difference signal of the first detector means is supplied to the first input and the reference signal is supplied to the second input, and wherein the output of the second detector means forms the output of the evaluation circuit,
wherein the second scaling means includes a voltage divider having a first resistor and a second resistor, wherein an output node of the second scaling means is between the first resistor and the second resistor and the output node is coupled to the second input of the second detector means for providing the reference signal to the second input of the second detector means.

19. The circuit arrangement according to claim 18, wherein the first scaling means includes a second voltage divider having a third resistor and a fourth resistor, and
wherein the first detector means includes a first comparator having a first input connected to the output of the current sensor means by a fifth resistor, and a second input connected to the first scaling means.

20. The circuit arrangement according to claim 18,
wherein the second detector means includes a second comparator having a first input connected to the output of the first detector means by a smoothing circuit, and a second input connected to the second scaling means.

21. The circuit arrangement of claim 1, further comprising:
a smoothing circuit having an input coupled to the output of the first detector means,
the smoothing circuit having an output coupled to the first input of the second detector means,
the smoothing circuit including a charge storage device arranged in parallel with a third resistor and coupled between the output of the smoothing circuit and a reference potential connection.

22. The circuit arrangement of claim 21, further comprising:
a rectifier arrangement coupled between the output of the first detector means and the input of the smoothing circuit.

23. The circuit arrangement of claim 22, wherein the smoothing circuit includes a fourth resistor connected in series with the rectifier arrangement.

24. The circuit arrangement of claim 1, wherein the switch control circuit comprises:
a transistor coupled to the output of the evaluation circuit, the transistor having a first main connection and a second main connection; and
a relay connected between the first main connection of the transistor and the power supply,
wherein the second main connection of the transistor is coupled to the power supply.

* * * * *

UNITED STATES PATENT AND TRADEMARK OFFICE
CERTIFICATE OF CORRECTION

PATENT NO. : 8,440,942 B2
APPLICATION NO. : 10/582925
DATED : May 14, 2013
INVENTOR(S) : Otto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1714 days.

Signed and Sealed this
Eighth Day of September, 2015

Michelle K. Lee
*Director of the United States Patent and Trademark Office*